United States Patent [19]

Ogawa

[11] Patent Number: 5,610,249
[45] Date of Patent: Mar. 11, 1997

[54] PROCESS FOR PRODUCTION OF STYRENE OR STYRENE DERIVATIVE POLYMER OF NARROW MOLECULAR WEIGHT DISTRUBITION

[75] Inventor: Tetsuo Ogawa, Hiratsuka, Japan

[73] Assignee: Kansai Paint Co., Ltd., Hyogo-ken, Japan

[21] Appl. No.: 590,478

[22] Filed: Jan. 24, 1996

[30] Foreign Application Priority Data

Jan. 24, 1995 [JP] Japan ................................ 7-027230

[51] Int. Cl.[6] .................................. C08F 2/38; C08F 12/04
[52] U.S. Cl. .................... 526/193; 526/204; 526/217; 526/218.1; 526/219; 526/219.2; 526/219.3; 526/219.6; 526/230; 526/232; 526/232.1; 526/240; 526/293; 526/299; 526/311; 526/346; 526/347; 526/347.1
[58] Field of Search ................................ 526/193, 204, 526/218.1, 219, 219.2, 233, 219.3, 219.6, 230, 232, 232.1, 346, 347, 347.1, 217

[56] References Cited

U.S. PATENT DOCUMENTS

| 5,322,912 | 6/1994 | Georges et al. . |
| 5,401,804 | 3/1995 | Georges et al. ................... 526/204 X |
| 5,449,724 | 9/1995 | Moffat et al. ..................... 526/193 X |
| 5,498,679 | 3/1996 | Moffat et al. ........................ 526/204 |

OTHER PUBLICATIONS

Macromolecules, vol. 26, pp. 2987–2988 (1993).

*Primary Examiner*—Fred Teskin
*Attorney, Agent, or Firm*—Wenderoth, Lind & Ponack

[57] ABSTRACT

The present invention provides a process for producing a styrene or styrene derivative polymer of narrow molecular weight distribution, which comprises (co)polymerizing a styrene or styrene derivative monomer using, as the catalyst system, a mixture of a free radical compound, a radical polymerization initiator and a phosphorus compound. With the present process, the polymerization speed is very high and a monodisperse polymer of narrow molecular weight distribution can be obtained easily.

16 Claims, No Drawings

PROCESS FOR PRODUCTION OF STYRENE OR STYRENE DERIVATIVE POLYMER OF NARROW MOLECULAR WEIGHT DISTRUBITION

BACKGROUND OF THE INVENTION

1. Field of the Invention

The present invention relates to a process for production of a styrene or styrene derivative polymer of narrow molecular weight distribution.

2. Description of the Prior Art

Various polymers are currently in production by polymerization of a vinyl compound using a radical polymerization initiator. Polymerization of a vinyl compound is also possible by using other polymerization initiator, i.e. an ionic polymerization initiator composed of a metal compound, whereby can be produced a polymer having a molecular weight distribution of smaller than 2 [the molecular weight distribution is generally expressed by the ratio (Mw/Mn) of weight-average molecular weight (Mw) and number-average molecular weight (Mn)].

In the above ionic polymerization, however, since a highly reactive polymerization initiator is used, presence of impurities (e.g. small amount of water and active-hydrogen-containing compound) in the reaction system hinders the polymerization reaction and allows the produced polymer to have a broad molecular weight distribution.

It was reported in Macromolecules, 26, 2987-2988 (1993) that polymerization of styrene using 2,2,6,6-tetramethyl-1-piperidinyloxy free radical (hereinafter abbreviated to TEMPO) (this is a nitroso radical compound) and benzoyl peroxide (an ordinary radical polymerization initiator) provided a styrene polymer of very narrow molecular weight distribution. This polymerization process, unlike the heretofore known process for production of styrene polymer of narrow molecular weight distribution wherein styrene polymerization is conducted at a low temperature using sodium naphthalene as the polymerization initiator, uses an ordinary radical polymerization initiator and accordingly makes simple the polymerization procedure; however, the polymerization rate is very low and a time as long as 69 hours is required to attain a conversion of, for example, 90% (number-average molecular weight of produced styrene polymer= 7,800, molecular weight distribution thereof=1.27).

Also, in U.S. Pat. No. 5,322,912 is disclosed a process wherein a protonic acid (e.g. a sulfonic acid or a carboxylic acid) is added to a free radical polymerization system in order to achieve a high polymerization rate. The polymer obtained by this process, however, contains the protonic acid used and accordingly has limited applications.

SUMMARY OF THE INVENTION

The present inventor made a study with an aid of developing a process for producing a monodisperse styrene polymer of narrow molecular weight distribution [(Mw/Mn)<2]. As a result, it was found that the above aim could be achieved by using a catalyst system containing, as the essential component, a mixture composed of a free radical compound, a radical polymerization initiator and a phosphorus compound. The finding has led to the completion of the present invention.

According to the present invention there is provided a process for producing a styrene or styrene derivative polymer of narrow molecular weight distribution by radical (co)polymerization of a styrene or styrene derivative monomer or a styrene or styrene derivative monomer and other comonomer, wherein the (co)polymerization is conducted in the presence of a catalyst system composed of a free radical compound, a radical polymerization initiator and a phosphorus compound.

DETAILED DESCRIPTION OF THE INVENTION

The polymerization process of the present invention is hereinafter described in detail.

The present process is characterized by using, in radical (co)polymerization of a styrene or styrene derivative monomer or a styrene or styrene derivative monomer and other comonomer, a catalyst system composed of the following three components:

(a) a free radical compound, (b) a radical polymerization initiator, and (c) a phosphorus compound and makes it possible to produce a styrene or styrene derivative polymer of very narrow molecular weight distribution.

The free radical compound (a) used in the present process is a compound which can by itself be present as a stable free radical at room temperature and also under polymerization conditions and, during polymerization, can react with a propagating terminal radical of polymer to form a redissociable bond. Examples thereof include 2,2,6,6-tetramethyl-1-piperidinyloxy free radical (TEMPO), 4-hydroxy-2,2,6,6-tetramethyl-1-piperidinyloxy free radical (4-hydroxy TEMPO), 3-carbamoyl-2,2,5,5-tetramethylpyrrolidin-1-yloxy free radical, 3-carbamoyl-2,2,5,5-tetramethyl-3-pyrrolin-1-yloxy free radical, di-t-butyl nitroxide free radical, 2,6-di-t-butyl-α-(3,5-di-t-butyl-4-oxo-2,5-cyclohexadien-1-ylidene)-p-tolyloxy free radical (galvinoxyl free radical) and 2,2-di(4-t-octyl phenyl)-1-picrylhydrazyl free radical (DPPH).

The radical polymerization initiator (b) also used in the present process is not particularly restricted and can be one ordinarily used in radical polymerization of a vinyl compound. Examples thereof include peroxides such as benzoyl peroxide, di-t-butyl hydroperoxide, t-butyl hydroperoxide, cumyl peroxide, cumene hydroperoxide, diisopropylbenzene hydroperoxide, t-butyl peroxybenzoate, lauryl peroxide, acetyl peroxide, t-butyl peroxy-2-ethyl hexanoate and the like; and azo compounds such as α,α'-azobisisobutyronitrile, azobisdimethylvaleronitrile, azobiscyclohexanecarbonitrile and the like. These compounds can be used singly or as admixture of two or more. The radical polymerization initiator (b) can be used in an amount of generally 0.05–5 moles, preferably 0.1–3 moles, more preferably 0.2–2 moles per mole of the free radical compound (a).

The phosphorus compound (c) used together with the free radical compound (a) and the radical polymerization initiator (b) in the present process, includes organic phosphorus compounds containing trivalent or pentavalent phosphorus. Examples thereof are phosphines such as trimethylphosphine, triethylphosphine, tri-n-propylphosphine, triisopropylphosphine, tri-n-butylphosphine, triisobutylphosphine, tri-sec-butylphosphine, tri-t-butylphosphine, triphenylphosphine, diphenylphosphine, dimethyl(phenyl)phosphine, methyldiphenylphosphine, tricyclohexylphosphine, dicyclohexylphosphine, tri-n-hexylphosphine, tri-n-octylphosphine, tri-o-tolylphosphine, tri-m-tolylphosphine, tri-p-tolylphosphine, dicyclo(ethyl)phosphine, dicyclo(phenyl)phosphine, chlorodiphenylphosphine, tetraphenyl diphosphine, bis(diphenylphosphino)methane, 1,2-bis(diphenylphosphino)ethane, 1,3-bis(diphenylphosphino)propane, 1,4-bis(diphenylphosphino)butane and the like; phosphine oxides such as tri-n-butylphosphine oxide, triphenylphosphine oxide, tri-n-octylphosphine oxide and the like; phosphorous acid esters such as trimethyl phosphite, dimethyl phosphite, triethyl phosphite, diethyl phosphite, triisopropyl phosphite, tri-n-butyl phosphite, triphenyl phosphite, diphenyl isodecyl phosphite, phenyl diisodecyl phosphite, triisodecyl phosphite, diphenyl isooctyl phosphite, phenyl diisooctyl phosphite, triisooctyl phosphite, di(nonylphenyl)dinonylphenylphosphite, tris(nonylphenyl) phosphite, distearyl pentaerythritol diphosphite, diisodecyl pentaerythritol diphosphite, poly(dipropylene glycol) phenylphosphites and the like; phosphorous amides such as hexamethylphosphorous triamide, hexaethylphosphorous triamide and the like; phosphoric acid esters such as trimethyl phosphate, triethyl phosphate, tri-n-butyl phosphate, triphenyl phosphate, and the like; and phosphoric triamides such as hexamethylphosphoric triamide. The phosphorus compound (c) is preferably an organic phosphorus compound containing trivalent phosphorus such as phosphine, phosphorous acid ester or phosphorous amide, more preferably a phosphorous acid ester. There can also be preferably used an organic phosphorus compound containing pentavalent phosphorus, such as phosphine oxide, phosphoric acid ester or phosphoric triamide. Most preferable as the phosphorus compound (c) is a phosphorous acid ester. The phosphorus compound (c) can be used in an amount of generally 0.1–10 moles, preferably 0.2–5 moles, more preferably 0.3–3 moles per mole of the free radical compound (a).

The styrene or styrene derivative monomer, which can be polymerized in the presence of the above-mentioned catalyst system, includes, for example, styrene and o-, m- or p-substitution products thereof such as N,N-dimethylaminostyrene, aminostyrene, hydroxystyrene, methoxystyrene, methyl styrene, ethylstyrene, isopropylstyrene, t-butylstyrene, fluorostyrene, chlorostyrene, bromostyrene, iodostyrene, carboxystyrene, ethylcarboxystyrene, methylcarboxystyrene, trifluoromethylstyrene, cyanostyrene, nitrostyrene, chloromethyl styrene, glycidyloxystyrene, sodium styrenesulfonate, potassium styrenesul fonate and the like. These compounds can be used singly or as admixture of two or more.

The comonomer, which can be copolymerized with the styrene or styrene derivative monomer, includes, for example, carboxyl group-containing unsaturated monomers such as acrylic acid, methacrylic acid, crotonic acid, itaconic acid, maleic acid, fumaric acid and the like; $C_{2-8}$ hydroxyalkyl esters of (meth)acrylic acid, such as 2-hydroxyethyl (meth)acrylate, 2-hydroxypropyl (meth)acrylate, 3-hydroxypropyl (meth)acrylate, hydroxybutyl (meth)acrylate and the like; monoesters between a polyether polyol (e.g. polyethylene glycol, polypropylene glycol or polybutylene glycol) and an unsaturated carboxylic acid [e.g. (meth)acrylic acid]; monoethers between a polyether polyol (e.g. polyethylene glycol, polypropylene glycol or polybutylene glycol ) and a hydroxyl group-containing unsaturated monomer [e.g. 2-hydroxyethyl (meth)acrylate]; adducts between an unsaturated carboxylic acid and a monoepoxy compound [e.g. Cardura E10 (a trade name of Shell, Japan Ltd.) or an α-olefin epoxide]; adducts between glycidyl (meth)acrylate and a monobasic acid (e.g. acetic acid, propionic acid, p-t-butylbenzoic acid or a fatty acid); monoesters or diesters between an acid anhydride group-containing unsaturated compound (e.g. maleic anhydride or iraconic anhydride) and a glycol (e.g. ethylene glycol, 1,6-hexanediol or neopentyl glycol); hydroxyalkyl vinyl ethers such as hydroxyethyl vinyl ether and the like; chlorine- and hydroxyl group-containing monomers such as 3-chloro-2-hydroxypropyl (meth)acrylate and the like; allyl alcohol; $C_{1-24}$ alkyl esters or cycloalkyl esters of (meth)acrylic acid, such as methyl acrylate, ethyl acrylate, propyl acrylate, isopropyl acrylate, n-, i- or t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-, i- or t-butyl methacrylate, hexyl methacrylate, 2-ethylhexyl methacrylate, octylmethacrylate, decyl methacrylate, lauryl methacrylate, stearyl methacrylate, cyclohexyl methacrylate and the like; $C_{2-18}$ alkoxyalkyl esters of (meth)acrylic acid, such as methoxybutyl acrylate, methoxybutyl methacrylate, methoxyethyl acrylate, methoxyethyl methacrylate, ethoxybutyl acrylate, ethoxybutyl methacrylate and the like; chain alkyl vinyl ethers such as ethyl vinyl ether, n-propyl vinyl ether, isopropyl vinyl ether, butyl vinyl ether, t-butyl vinyl ether, pentyl vinyl ether, hexyl vinyl ether, octyl vinyl ether and the like; cycloalkyl vinyl ethers such as cyclopentyl vinyl ether, cyclohexyl vinyl ether and the like; aryl vinyl ethers such as phenyl vinyl ether, tolyl vinyl ether and the like; aralkyl vinyl ethers such as benzyl vinyl ether, phenethyl vinyl ether and the like; allyl ethers such as allyl glycidyl ether, allyl ethyl ether and the like; olefin or diene compounds such as ethylene, propylene, butylene, vinyl chloride, butadiene, isoprene, chloroprene and the like; hydrocarbon ring-containing unsaturated monomers such as α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethyl hydrogenphthalate, 2-acryloyloxypropyl hydrogenphthalate, 2-acryloyloxypropyl hexahydrohydrogenphthalate, 2-acryloyloxypropyl tetrahydrohydrogenphthalate, an ester between p-t-butylbenzoic acid and hydroxyethyl (meth)acrylate, dicyclopentenyl (meth)acrylate and the like; nitrogen-containing alkyl (meth)acrylates such as N,N-dimethyl-aminoethyl (meth)acrylate, N,N-diethylaminoethyl (meth)acrylate, N-t-butyl aminoethyl (meth)acrylate and the like; polymerizable amides such as acrylamide, methacrylamide, N-methyl (meth)acrylamide, N-ethyl (meth)acrylamide, N,N-dimethyl(meth)acrylamide, N,N-dimethylaminopropyl (meth)acrylamide, N,N-dimethylaminoethyl(meth)acrylamide and the like; nitrogen-containing aromatic monomers such as 2-vinylpyridine, 1-vinyl-2-pyrrolidone, 4-vinylpyridine and the like; polymerizable nitriles such as acrylonitrile, methacrylonitrile and the like; nitrogen-containing unsaturated monomers such as allylamine and the like; glycidyl group-containing vinyl monomers such as glycidyl (meth)acrylate, allyl glycidyl ether, 3,4-epoxycyclohexylmethyl (meth)acrylate and the like; and alkoxysilyl group-containing vinyl conomers such as vinyltrimethoxysilane, vinyltriethoxysilane, vinyltripropoxysilane, γ-methacryloxypropyltrimethoxysilane, γ-methacryloxypropyltriethoxysilane, γ-methacryloxypropyltripropoxysiane and the like. These compounds can be used singly or as admixture of two or more.

The above monomers can be used in a total amount of generally 5–2,000 moles, preferably 10–1,000 moles per mole of the free radical compound (a).

The radical (co)polymerization of the above-mentioned monomer(s) in the presence of the above-mentioned catalyst system can be conducted, for example, as follows.

When polymerization is conducted according to the present process, it is generally preferable that at first a styrene or styrene derivative monomer, a free radical compound (a), a radical polymerization initiator (b) and a phosphorus compound (c) are mixed and the mixture is subjected to a preliminary reaction at 60°–100° C. for 10 minutes to 6 hours. When this preliminary reaction is not conducted, the resulting styrene or styrene derivative polymer may have a broad molecular weight distribution or the molecular weight control of the polymer may be difficult. Then, polymerization can be conducted at 110°–150° C. with stirring. In the case of copolymerization, it is preferable that a styrene or styrene derivative monomer is added and polymerization thereof is conducted and, at the latter period of the polymerization, other comonomer is added to conduct further polymerization. The polymerization of the present process is preferably conducted generally with an inert gas (e.g. nitrogen or argon) being blown into the reaction system. As necessary, an organic solvent may be used. The organic solvent includes, for example, aromatic solvents such as xylene, toluene and the like; alcohol type solvents such as n-butanol, isopropyl alcohol and the like; ketone type solvents such as methyl ethyl ketone, methyl isobutyl ketone and the like; and ester type solvents such as ethyl acetate, butyl acetate, isobutyl acetate and the like.

The phosphorus compound (c) may be added at the time when polymerization is conducted at 110°–150° C. after a mixture of a styrene or styrene derivative monomer, a free radical compound (a) and a radical polymerization initiator (b) have been subjected to a preliminary reaction at 60°–110° C. for 10 minutes to 6 hours.

According to the polymerization process of the present invention, the polymerization rate is very high and there can be obtained a styrene or styrene derivative polymer of narrow molecular weight distribution which generally has a Mw/Mn ratio of smaller than 2, preferably 1.6 or less and which is preferably monodisperse. Also according to the present invention, there can be easily obtained a styrene or styrene derivative polymer having a number-average molecular weight of generally 500–200,000, preferably 500–150,000, more preferably 1,000–100,000.

The styrene or styrene derivative polymer obtained by the present process, when containing a self-crosslinkable functional group (e.g. an alkoxysilyl group, a glycidyl group or an N-methylol group), can be converted into a three-dimensional crosslinked resin by heating the polymer itself or by adding a curing catalyst to the polymer and, as necessary, heating the mixture. The styrene or styrene derivative polymer obtained by the present process, when containing a crosslinkable functional group (e.g. an hydroxyl group, a carboxyl group, a glycidyl group, an alkoxysilyl group or an N-methylol group), can be converted into a three-dimensional crosslinked resin by using, in combination, a curing agent reactive with the crosslinkable functional group.

It is also possible to introduce the above-mentioned (self-)crosslinkable functional group into the styrene or styrene derivative polymer obtained by the present process.

The styrene or styrene derivative polymer obtained by the present process can be used as a molding material or a film material, or in coatings, inks, resists, etc.

EXAMPLES

The present invention is hereinafter described more specifically by way of Examples. In the followings, "part(s)" and "%" refer to "part(s) by weight" and "% by weight", respectively. All the raw materials used in Examples and Comparative Examples were commercial products.

Example 1

| | |
|---|---|
| TEMPO | 7.5 parts |
| Styrene | 1,000 parts |
| Benzoyl peroxide | 7.7 parts |
| Triphenyl phosphite | 14.9 parts |

A mixture consisting of the above components was stirred at 95° C. for 4 hours while blowing nitrogen gas thereinto, followed by stirring at 123° C. for 8 hours. In the reaction mixture, the conversion was 80% as measured by proton NMR and the polymer formed was found, as measured by GPC (gel permeation chromatography), to be a monodisperse resin having a number-average molecular weight (Mn) of 17,500 and a molecular weight distribution (Mw/Mn) of 1.25.

Example 2

| | |
|---|---|
| 3-Carbamoyl-2,2,5,5-tetramethylpyrrolidin-1-yloxy free radical | 8.9 parts |
| Styrene | 1,000 parts |
| Benzoyl peroxide | 7.7 parts |
| Diphenyl isooctyl phosphite | 15.0 parts |

A mixture consisting of the above components was stirred at 95° C. for 4 hours while blowing nitrogen gas thereinto, followed by stirring at 123° C. for 8 hours. In the reaction mixture, the conversion was 75% as measured by proton NMR and the polymer formed was found, as measured by GPC (gel permeation chromatography), to be a monodisperse resin having a number-average molecular weight (Mn) of 16,300 and a molecular weight distribution (Mw/Mn) of 1.28.

Example 3

| | |
|---|---|
| TEMPO | 7.5 parts |
| Styrene | 1,000 parts |
| Benzoyl peroxide | 7.7 parts |

A mixture consisting of the above components was stirred at 95° C. for 4 hours while blowing nitrogen gas thereinto. Thereto was added 18.0 parts of triphenyl phosphite, followed by stirring at 123° C. for 8 hours. In the reaction mixture, the conversion was 70% as measured by proton NMR and the polymer formed was found, as measured by GPC (gel permeation chromatography), to be a monodisperse resin having a number-average molecular weight (Mn) of 15,400 and a molecular weight distribution (Mw/Mn) of 1.33.

Example 4

| | |
|---|---|
| TEMPO | 7.5 parts |
| p-Chloromethylstyrene | 1,000 parts |
| Benzoyl peroxide | 7.7 parts |
| Trimethyl phosphite | 12.0 parts |

A mixture consisting of the above components was stirred at 95° C. for 4 hours while blowing nitrogen gas thereinto, followed by stirring at 123° C. for 8 hours. In the reaction mixture, the conversion was 80% as measured by proton NMR and the polymer formed was found, as measured by GPC (gel permeation chromatography), to be a monodisperse resin having a number-average molecular weight (Mn) of 16,700 and a molecular weight distribution (Mw/Mn) of 1.25.

Example 5

| TEMPO | 7.5 parts |
|---|---|
| Styrene | 1,000 parts |
| α,α'-Azobisisobutyronitrile | 5.3 parts |
| Tri(nonylphenyl) phosphite | 24.4 parts |

A mixture consisting of the above components was stirred at 95° C. for 4 hours while blowing nitrogen gas thereinto, followed by stirring at 123° C. for 8 hours. In the reaction mixture, the conversion was 87% as measured by proton NMR and the polymer formed was found, as measured by GPC (gel permeation chromatography), to be a monodisperse resin having a number-average molecular weight (Mn) of 18,500 and a molecular weight distribution (Mw/Mn) of 1.23.

Example 6

| TEMPO | 7.5 parts |
|---|---|
| Styrene | 1,000 parts |
| Benzoyl peroxide | 7.7 parts |
| Triphenyl phosphite | 18.0 parts |

A mixture consisting of the above components was stirred at 95° C. for 4 hours while blowing nitrogen gas thereinto, followed by stirring at 123° C. for 7 hours (the conversion of styrene was 67%). Thereto was added 683 parts of t-butyl methacrylate, followed by stirring at 123° C. for 2 hours. In the reaction mixture, the conversion of styrene was 80% and the conversion of t-butyl methacrylate was 40% as measured by proton NMR, and the polymer formed was, as measured by GPC (gel permeation chromatography), to be a monodisperse resin having a number-average molecular weight (Mn) of 22,500 and a molecular weight distribution (Mw/Mn) of 1.30.

Example 7

| TEMPO | 9.4 parts |
|---|---|
| Styrene | 1,000 parts |
| t-Butyl peroxy-2-ethylhexanoate | 7.8 parts |
| Triphenyl phosphite | 12.4 parts |

A mixture consisting of the above components was stirred at 95° C. for 4 hours while blowing nitrogen gas thereinto. Thereto was added 173 parts of acrylic acid, followed by stirring at 123° C. for 3 hours. In the reaction mixture, the conversion of styrene was 72% and the conversion of acrylic acid was 90% as measured by proton NMR, and the polymer formed was found, as measured by GPC (gel permeation chromatography), to be a monodisperse resin having a number-average molecular weight (Mn) of 15,900 and a molecular weight distribution (Mw/Mn) of 1.27.

Example 8

| TEMPO | 15 parts |
|---|---|
| Styrene | 1,000 parts |
| t-Butyl peroxy-2-ethylhexanoate | 12.5 parts |
| Triphenyl phosphite | 89.4 parts |

A mixture consisting of the above components was stirred at 95° C. for 4 hours while blowing nitrogen gas thereinto. Thereto was added 1,231 parts of n-butyl acrylate, followed by stirring at 123° C. for 3 hours. In the reaction mixture, the conversion of styrene was 70% and the conversion of n-butyl acrylate was 57% as measured by proton NMR, and the polymer formed was found, as measured by GPC (gel permeation chromatography), to be a monodisperse resin having a number-average molecular weight (Mn) of 15,700 and a molecular weight distribution (Mw/Mn) of 1.22.

Example 9

| TEMPO | 15 parts |
|---|---|
| Styrene | 1,000 parts |
| t-Butyl peroxy-2-ethylhexanoate | 12.5 parts |
| Triphenyl phosphite | 59.6 parts |

A mixture consisting of the above components was stirred at 95° C. for 4 hours while blowing nitrogen gas thereinto. Thereto was added 558 parts of 2-hydroxyethyl acrylate, followed by stirring at 123° C. for 6 hours. In the reaction mixture, the conversion of styrene was 76% and the conversion of 2-hydroxyethyl acrylate was 63% as measured by proton NMR, and the polymer formed was found, as measured by GPC (gel permeation chromatography), to be a monodisperse resin having a number-average molecular weight (Mn) of 12,700 and a molecular weight distribution (Mw/Mn) of 1.33.

Example 10

| TEMPO | 12.5 parts |
|---|---|
| Styrene | 1,000 parts |
| Benzoyl peroxide | 12.9 parts |
| Triphenyl phosphite | 40.6 parts |

A mixture consisting of the above components was stirred at 95° C. for 4 hours while blowing nitrogen gas thereinto. Thereto were added 410 parts of n-butyl acrylate and 455 parts of glycidyl methacrylate, followed by stirring at 123° C. for 6 hours. In the reaction mixture, the conversion of styrene was 72%, the conversion of n-butyl acrylate was 63% and the conversion of glycidyl methacrylate was 67% as measured by proton NMR; and the polymer formed was found, as measured by GPC (gel permeation chromatography), to be a monodisperse resin having a number-average molecular weight (Mn) of 16,000 and a molecular weight distribution (Mw/Mn) of 1.33.

Example 11

| Di-t-butyl nitroxide free radical | 6.9 parts |
|---|---|
| Styrene | 1,000 parts |
| Benzoyl peroxide | 7.7 parts |
| Tri(nonylphenyl) phosphite | 18.0 parts |

A mixture consisting of the above components was stirred at 95° C. for 4 hours while blowing nitrogen gas thereinto, followed by stirring at 123° C. for 5 hours (the conversion of styrene was 84%). Thereto was added 420 parts of m-xylene, followed by stirring at 123° C. for 8 hours. In the reaction mixture, the conversion of styrene was 99% or more (in proton NMR measurement, only a trace amount of styrene was detected) and the polymer formed was found, as measured by GPC (gel permeation chromatography), to be a monodisperse resin having a number-average molecular weight (Mn) of 21,100 and a molecular weight distribution (Mw/Mn) of 1.28. Then, 615 parts of n-butyl acrylate was added and stirring was conducted at 123° C. for 2 hours. The conversion of n-butyl acrylate was 15%. The polymer formed, when subjected to GPC, was a monodisperse resin whose molecular weight shifted to a higher side owing to the addition of n-butyl acrylate. It had a number-average molecular weight (Mn) of 23,100 and a molecular weight distribution (Mw/Mn) of 1.29.

Comparative Example 1

| | |
|---|---|
| TEMPO | 7.5 parts |
| Styrene | 1,000 parts |
| Benzoyl peroxide | 7.7 parts |

A mixture consisting of the above components was stirred at 95° C. for 4 hours while blowing nitrogen gas thereinto, followed by stirring at 123° C. for 8 hours. In the reaction mixture, the conversion was 18% as measured by proton NMR and the polymer formed was found, as measured by GPC (gel permeation chromatography), to be a monodisperse resin having a number-average molecular weight (Mn) of 3,900 and a molecular weight distribution (Mw/Mn) of 1.29.

Comparative Example 2

| | |
|---|---|
| Di-t-butyl nitroxide free radical | 6.9 parts |
| Styrene | 1,000 parts |
| Benzoyl peroxide | 7.7 parts |

A mixture consisting of the above components was stirred at 95° C. for 4 hours while blowing nitrogen gas thereinto, followed by stirring at 123° C. for 5 hours. In the reaction mixture, the conversion was 29% as measured by proton NMR and the polymer formed was found, as measured by GPC (gel permeation chromatography), to be a monodisperse resin having a number-average molecular weight (Mn) of 6,600 and a molecular weight distribution (Mw/Mn) of 1.36.

Comparative Example 3

| | |
|---|---|
| TEMPO | 9.4 parts |
| Styrene | 1,000 Parts |
| t-Butyl peroxy-2-ethyhexanoate | 7.8 parts |

A mixture consisting of the above components was stirred at 95° C. for 4 hours while blowing nitrogen gas thereinto. Thereto was added 173 parts of acrylic acid, followed by stirring at 123° C. for 3 hours. In the reaction mixture, the conversion of styrene was 41% and the conversion of acrylic acid was 52% as measured by proton NMR, and the polymer formed was found, as measured by GPC (gel permeation chromatography), to be a monodisperse resin having a number-average molecular weight (Mn) of 8,700 and a molecular weight distribution (Mw/Mn) of 1.27.

Comparative Example 4

| | |
|---|---|
| Styrene | 1,000 parts |
| Benzoyl peroxide | 7.7 parts |
| Triphenyl phosphite | 18.0 parts |

A mixture consisting of the above components was stirred at 95° C. for 4 hours while blowing nitrogen gas thereinto, followed by stirring at 123° C. for 8 hours. In the reaction mixture, the conversion was 99% or more (in proton NMR measurement, styrene could not be detected). The polymer formed was found, as measured GPC (gel permeation chromatography), to be a monodisperse resin having a number-average molecular weight (Mn) of 12,000 and a molecular weight distribution (Mw/Mn) of 2.7.

Comparative Example 5

| | |
|---|---|
| Styrene | 1,000 parts |
| Benzoyl peroxide | 7.7 parts |

A mixture consisting of the above components was stirred at 95° C. for 4 hours while blowing nitrogen gas thereinto, followed by stirring at 123° C. for 8 hours. In the reaction mixture, the conversion was 99% or more (in proton NMR measurement, styrene could not be detected). The polymer formed was found, as measured by GPC (gel permeation chromatography), to be a monodisperse resin having a number-average molecular weight (Mn) of 15,000 and a molecular weight distribution (Mw/Mn) of 2.9.

What is claimed is:

1. A process for producing a styrene or styrene derivative polymer of narrow molecular weight distribution by radical (co)polymerization of a styrene or styrene derivative monomer or a styrene or styrene derivative monomer and other comonomer, wherein the (co)polymerization is conducted in the presence of a catalyst system composed of a free radical compound, a radical polymerization initiator and a phosphorus compound, said phosphorus compound being selected from the group consisting of organic phosphines, organic phosphorous acid esters, organic phosphorous amides, organic phosphine oxides, organic phosphoric acid esters and organic phosphoric triamides.

2. A process according to claim 1, wherein the free radical compound is selected from the group consisting of 2,2,6,6-tetramethyl-1-piperidinyloxy free radical (TEMPO), 4-hydroxy-2,2,6,6-tetramethyl-1-piperidinyloxy free radical (4-hydroxy TEMPO), 3-carbamoyl-2,2,5,5-tetramethylpyrrolidin-1-yloxy free radical, 3-carbamoyl-2,2,5,5-tetramethyl-3-pyrrolin-1-yloxy free radical, di-t-butyl nitroxide free radical, 2,6-di-t-butyl-α-(3,5-di-t-butyl-4-oxo-2,5-cyclohexadien-1-ylidene)-p-tolyloxy free radical (galvinoxyl free radical) and 2,2-di(4-t-octyl phenyl)-1-picrylhydrazyl free radical (DPPH).

3. A process according to claim 1, wherein the radical polymerization initiator is selected from the group consisting of benzoyl peroxide, di-t-butyl hydroperoxide, t-butyl hydroperoxide, cumyl peroxide, cumene hydroperoxide, diisopropylbenzene hydroperoxide, t-butyl peroxybenzoate, lauryl peroxide, acetyl peroxide, t-butyl peroxy-2-ethylhexanoate, α,α'-azobisisobutyronitrile, azobisdimethylvaleronitrile and azobiscyclohexanecarbonitrile.

4. A process according to claim 1, wherein the radical polymerization initiator is used in an amount of 0.05–5 moles per mole of the free radical compound.

5. A process according to claim 4, wherein the radical polymerization initiator is used in an amount of 0.1–3 moles per mole of the free radical compound.

6. A process according to claim 1, wherein the organic phosphorus compound containing trivalent phosphorus is a phosphorous acid ester.

7. A process according to claim 1, wherein the phosphorus compound is selected from the group consisting of trimethylphosphine, triethylphosphine, tri-n-propylphosphine, triisopropylphosphine, tri-n-butylphosphine, triisobutylphosphine, tri-sec-butylphosphine, tri-t-butylphosphine, tri phenyl phosphine, diphenylphosphine, dimethyl(phenyl)phosphine, methyldiphenylphosphine, tricyclohexylphosphine, dicyclohexylphosphine, tri-n-hexylphosphine, tri-n-octylphosphine, tri-o-tolyl phosphine, tri-m-tolylphosphine, tri-p-tolylphosphine, dicyclo(ethyl)phosphine, dicyclo(phenyl)phosphine, chlorodiphenylphosphine, tetraphenyl diphosphine, bis(diphenylphosphi no)methane, 1,2-bis(diphenylphosphino)ethane, 1,3-bis(diphenylphosphino)propane, 1,4-bis(diphenylphosphino)butane, tri-n-butylphosphine oxide, triphenylphosphine oxide, tri-n-octylphosphine oxide, trimethyl phosphite, dimethyl phosphite, triethyl phosphite, diethyl phosphite, triisopropyl phosphite, tri-n-butyl phosphite, triphenyl phosphite, diphenyl isodecyl phosphite, phenyl diisodecyl phosphite, triisodecyl phosphite, diphenyl isooctyl phosphite, phenyl diisooctyl phosphite, triisooctyl phosphite, di(nonylphenyl)dinonylphenylphosphite, tris(nonylphenyl) phosphite, distearyl pentaerythritol diphosphite, diisodecyl pentaerythritol diphosphite, poly(dipropylene glycol) phenylphosphites, hexamethyl phosphorous triamide, hexaethyl phosphorous triamide, trimethyl phosphate, triethyl phosphate, tri-n-butyl phosphate, triphenyl phosphate and hexamethylphosphoric triamide.

8. A process according to claim 1, wherein the phosphorus compound is used in an amount of 0.1–10 moles per mole of the free radical compound.

9. A process according to claim 8, wherein the phosphorus compound is used in an amount of 0.2–5 moles per mole of the free radical compound.

10. A process according to claim 1, wherein the styrene or styrene derivative monomer is selected from the group consisting of styrene, N,N-dimethylaminostyrene, aminostyrene, hydroxystyrene, methoxystyrene, methylstyrene, ethylstyrene, isopropylstyrene, t-butylstyrene, fluorostyrene, chlorostyrene, bromostyrerie, iodostyrene, carboxystyrene, ethylcarboxystyrene, methylcarboxystyrene, trifluoromethylstyrene, cyanostyrene, nitrostyrene, chloromethylstyrene, glycidyloxystyrene, sodium styrenesulfonate and potassium styrenesulfonate.

11. A process according to claim 1, wherein the styrene or styrene derivative monomer or the styrene or styrene derivative monomer and the other comonomer are used in a total amount of 5–2,000 moles per mole of the free radical compound.

12. A process according to claim 1, wherein preliminary reaction is conducted prior to the (co)polymerization.

13. A process according to claim 1, wherein there is produced a styrene or styrene derivative polymer having a Mw/Mn ratio of weight-average molecular weight (Mw) and number-average molecular weight (Mn), of smaller than 2.

14. A process according to claim 13, wherein the Mw/Mn ratio is 1.6 or less.

15. A process according to claim 1, wherein there is produced a styrene or styrene derivative polymer having a number-average molecular weight of 500–200,000.

16. A process according to claim 15, wherein the number-average molecular weight is 500–150,000.

* * * * *